US007819044B2

(12) United States Patent
Meredith

(10) Patent No.: US 7,819,044 B2
(45) Date of Patent: Oct. 26, 2010

(54) FENCE ARRANGEMENT FOR A SLIDE MITER SAW

(75) Inventor: Daryl S. Meredith, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/657,524

(22) Filed: Sep. 8, 2003

(65) Prior Publication Data

US 2004/0103768 A1 Jun. 3, 2004

Related U.S. Application Data

(60) Provisional application No. 60/415,255, filed on Oct. 1, 2002.

(51) Int. Cl.
*B23D 45/04* (2006.01)
*B23D 45/14* (2006.01)
*B26D 7/01* (2006.01)
*B27B 27/08* (2006.01)

(52) U.S. Cl. .............. 83/468.3; 83/468.1; 83/468.6; 83/468.7; 83/471.3; 83/486.1; 83/490; 269/315; 269/319

(58) Field of Classification Search ........... 83/471.2, 83/471.3, 467.1, 468, 468.1, 468.2, 468.3, 83/468.5, 468.6, 468.7, 486.1, 489, 490, 83/581; 269/315, 319
See application file for complete search history.

(56) References Cited

U.S. PATENT DOCUMENTS

| 4,077,290 A | | 3/1978 | Hreha | |
|---|---|---|---|---|
| 4,869,142 A | * | 9/1989 | Sato et al. ............ | 83/471.3 X |
| 4,875,399 A | * | 10/1989 | Scott et al. ............ | 83/468.3 |
| 5,054,352 A | | 10/1991 | Fushiya et al. | |
| 5,297,463 A | * | 3/1994 | O'Banion et al. ...... | 83/471.3 X |
| 5,483,858 A | | 1/1996 | Chen | |
| 5,755,148 A | * | 5/1998 | Stumpf et al. ............ | 83/468.2 |
| 5,855,366 A | * | 1/1999 | Chang .................. | 269/315 |
| 5,862,732 A | | 1/1999 | Itzov | |
| 5,943,931 A | * | 8/1999 | Stumpf et al. .......... | 83/471.3 X |
| 6,067,885 A | | 5/2000 | Brunson et al. | |

(Continued)

FOREIGN PATENT DOCUMENTS

BE 555 411 A 2/1957

(Continued)

OTHER PUBLICATIONS

D. Chariot, European Search Report on European Patent Application No. EP 03 02 1424, Dec. 16, 2003, The Hague.

(Continued)

*Primary Examiner*—Clark F. Dexter
(74) *Attorney, Agent, or Firm*—Adan Ayala

(57) ABSTRACT

A miter saw including a base, a table rotatably attached to the base, a saw assembly movable between a front position and a rear position, and a fence assembly attached to the base, the fence assembly including a fixed fence fixedly attached to the base, a movable fence movably connected to the fixed fence, the movable fence defining a first support plane, and an auxiliary fence disposed behind at least one of the fixed fence and the movable fence, the auxiliary fence defining a second support plane substantially parallel to the first support plane.

7 Claims, 1 Drawing Sheet

U.S. PATENT DOCUMENTS

| | | | |
|---|---|---|---|
| 6,073,529 A * | 6/2000 | Shibata et al. | 83/471.3 X |
| 6,272,960 B1 | 8/2001 | Dibbern et al. | |
| 6,279,442 B1 * | 8/2001 | Chang | 83/397 |
| 6,513,412 B2 * | 2/2003 | Young | 83/471.3 |
| 6,543,323 B2 * | 4/2003 | Hayashizaki et al. | 83/471.3 X |
| 6,899,005 B1 * | 5/2005 | O'Banion et al. | 83/468.3 |
| 2003/0213350 A1 * | 11/2003 | Chang | 83/477.1 |
| 2004/0020342 A1 * | 2/2004 | Wattenbach | 83/860 |

FOREIGN PATENT DOCUMENTS

| | | | |
|---|---|---|---|
| DE | 41 23 435 | * | 1/1992 |
| EP | 0 752 300 A | | 1/1997 |

OTHER PUBLICATIONS

Annex to the European Search Report on European Patent Application No. EP 03 02 1424.

* cited by examiner

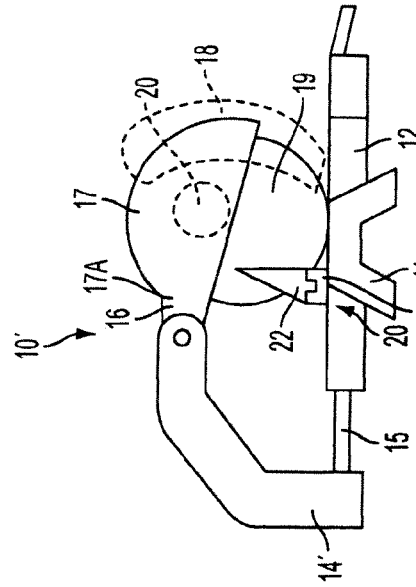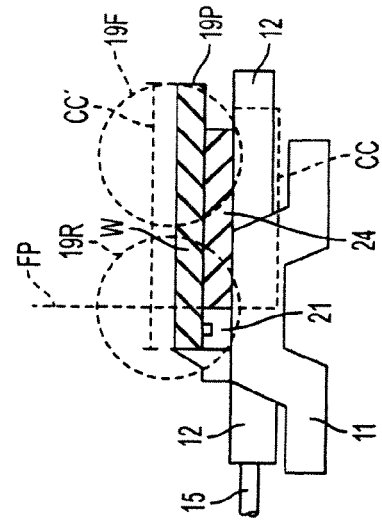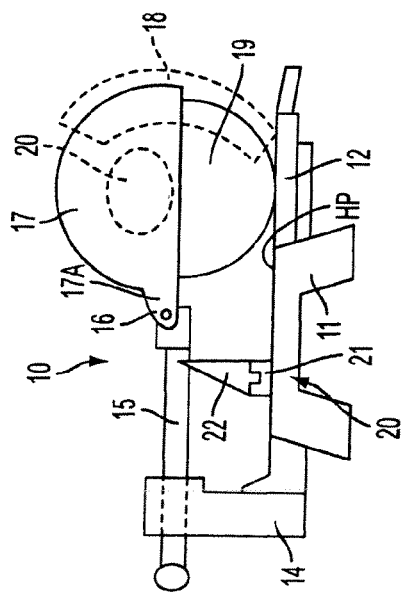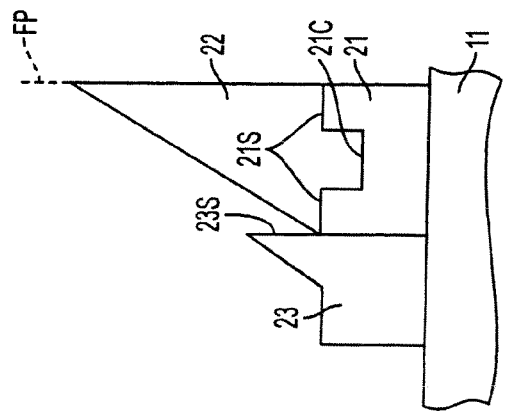

FENCE ARRANGEMENT FOR A SLIDE MITER SAW

This application claims priority from U.S. Provisional Application No. 60/415,255, filed Oct. 1, 2002.

FIELD OF THE INVENTION

This invention relates generally to slide miter saws and specifically to fence arrangements for slide miter saws.

BACKGROUND OF THE INVENTION

Slide miter saws are well known in the art as they provide extended cutting range over non-sliding miter saws. Referring to FIGS. 1-2, typical prior art slide miter saws have a base 11, a rotatable table 12 attached to the base 11, and a saw assembly which comprises a trunnion 16, a pivot an 17A pivotally attached to trunnion 16, a motor 25 a blade 19 driven by the motor 25, an upper blade guard 17 for covering an upper part of blade 19, and a lower blade guard 18 pivotally attached to the upper blade guard 17 for covering a lower part of blade 19, Motor 25 is typically attached to the upper blade guard 17.

The slide miter saws also typically have a movable fence assembly 20 attached to the base 11. Movable fence assembly 20 extends laterally across table 12, against which a workpiece can be positioned and supported for performing a cutting operation thereon. Movable fence assembly 20 includes a fixed fence 21 attached to base 11, and a movable fence 22 connected to the fixed fence 21. Typically, movable fence 22 is slidably attached to fixed fence 21.

In addition, slide miter saws have a mechanism to enable the user to move the saw assembly horizontally along the table 12. Referring to FIG. 1, most slide miter saws 10 accomplish this by connecting the saw assembly to at least one rail 15, which is slidably attached to a support housing 14 connected to the table 11 (see, e.g., U.S. Pat. No. 6,067,885).

Alternatively, slide miter saws 10' have at least one rail 15 that may be slidably connected to table 12, as shown in FIG. 2. Support housing 14' is then fixedly attached to the rail(s) 15. In addition, support housing 14: is attached to trunnion 16. See, e.g., U.S. Pat. No. 5,054,352.

Another arrangement is disclosed in U.S. Pat. No. 5,862,732, which is wholly incorporated herein by reference, where rail 15 is fixedly attached to table 12, and support housing 14 (and the saw assembly) slide along rail 15.

With such arrangements, the user would pull the saw assembly forwardly, move the saw assembly downwardly, then push the saw assembly rearwardly for cutting the workpiece.

SUMMARY OF THE INVENTION

In accordance with the present invention, an improved miter saw is employed. The miter saw includes a base, a table rotatably attached to the base, a saw assembly movable between a front position and a rear position, the saw assembly comprising a trunnion, a pivot arm pivotally attached to the trunnion, an upper blade guard connected to the pivot arm, a motor attached to the upper blade guard, and a blade driven by the motor, a support housing connected to one of the table and the saw assembly, at least one rail slidably connected to one of the table and the support housing, and a fence assembly attached to the base, the fence assembly comprising a fixed fence fixedly attached to the base, a movable fence movably connected to the fixed fence, the movable fence defining a first support plane, and an auxiliary fence disposed behind at least one of the fixed fence and the movable fence, the auxiliary fence defining a second support plane substantially parallel to the first support plane.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a side view of a first slide miter saw;

FIG. 2 is a side view of a second slide miter saw;

FIG. 3 is a side view of the fence arrangement according to the invention; and

FIG. 4 is a partial side view of a slide miter saw with the fence arrangement of FIG. 3.

DETAILED DESCRIPTION

The invention is now described with reference to the accompanying figures, wherein like numerals designate like parts. The present invention can be disposed on any slide miter saws, such as the slide miter saws disclosed in U.S. Pat. Nos. 6,067,885, 5,862,732 or 5,054,352 and/or shown in FIGS. 1-2. The teachings of U.S. Pat. Nos. 6,067,885, 5,862,732 or 5,054,352 are wholly incorporated herein by reference.

Referring to FIGS. 1-3, the slide miter saw 10 may also have a movable fence assembly 20 attached to the base 11. Movable fence assembly 20 preferably extends laterally across table 12, against which a workpiece can be positioned and supported for performing a cutting operation thereon. Movable fence assembly 20 may include a fixed fence 21 attached to base 11, and a movable fence 22 connected to the fixed fence 21. Preferably, movable fence 22 is slidably attached to fixed fence 21. Persons skilled in the art are referred to U.S. Pat. Nos. 5,297,463 and 5,943,931, which are wholly incorporated by reference herein.

Movable fence 22 and/or fixed fence 21 have support surfaces that define a fence plane FP for supporting a workpiece. Preferably, fixed fence 21 and movable fence 22 are substantially coplanar. Fence plane FP is preferably substantially vertical.

In addition, base 11 and/or table 12 define a horizontal plane HP for supporting the workpiece. Preferably, base 11 and table 12 are substantially coplanar.

Fixed fence 21 may have upper surfaces 21S which are preferably substantially coplanar and are separated by a channel 21C. Upper surfaces 21S are preferably parallel to the horizontal plane HP.

It is advantageous to provide an auxiliary fence 23 behind fixed fence 21 and/or movable fence 22. Auxiliary fence 23 preferably has a surface 23S which is substantially vertical and/or substantially parallel to fence plane FP.

With such arrangement, the user can remove movable fence 22 and dispose a spacer block 24 on base 11 and/or table 12, as shown in FIG. 4. Spacer block 24 preferably has the same height as fixed fence 21. A workpiece W can then be placed on fixed fence 21 and spacer block 24. Workpiece W can also be placed against the support surface 23S of the auxiliary fence 23.

Such arrangement effectively increases the cutting capacity without requiring additional saw assembly travel and/or longer rails 15. As shown in FIG. 4, the cutting capacity of slide miter saw 10 is typically distance CC, which is the distance between fence plane FP and the point of intersection between blade 19 and table 12 at the blade's forwardmost position (position 19F).

By placing a spacer block 24 on table 12 and/or base 11 and disposing the workpiece W on spacer block 24 and fixed fence 21, the workpiece W is elevated above horizontal plane HP. This effectively increases the cutting capacity because the blade 19 can now cut at a point 19P, which is farther from the fence plane FP than the point of intersection between blade 19 and table 12.

The cutting capacity is also increased because part of workpiece W is disposed behind fence plane FP. Preferably, surface 23S is disposed to maximize cutting capacity by ensuring that, when the blade 19 is disposed at the rearmost position of its travel (position 19R), a workpiece W can still be fully cut.

For example, in a twelve-inch slide miter saw, cutting distance CC could be about 14 inches. If the height of fixed fence 21 and spacer block are about 1.5 inches, and surface 23S is disposed about 1.65 inches behind the fence plane FP, the resulting cutting capacity CC' for the same twelve-inch miter saw will be about 16.5 inches.

Persons skilled in the art may recognize other additions or alternatives to the means disclosed herein. However, all these additions and/or alterations are considered to be equivalents of the present invention.

What is claimed is:

1. A saw comprising:
   a base for supporting a workpiece;
   a table rotatably connected to the base;
   a saw assembly pivotably attached to the table and rotatable therewith, the saw assembly comprising a pivot arm for the pivotable attachment, an upper blade guard connected to the pivot arm, a motor attached to the upper blade guard, and a blade driven by the motor, the saw assembly being pivotable between an upper position for not engaging the workpiece, and a lower position for engaging the workpiece; and
   a fence assembly attached to the base and disposed on one side of a cutting plane of the blade, the fence assembly comprising
      a fixed fence fixedly attached to the base and disposed on the one side of the cutting plane of the blade, the fixed fence having a front portion and a rear portion, each portion having a substantially horizontal support surface, and a channel between the horizontal support surfaces of the front and rear portions,
      a movable fence slidably connected to and removably connected to the fixed fence and disposed on the one side of the cutting plane of the blade, the movable fence being linearly movable horizontally relative to the fixed fence along the channel, the movable fence defining a first substantially vertical support plane, at least one of the fixed fence and the movable fence for contacting the workpiece, and
      an auxiliary fence attached to the base and disposed on the one side of the cutting plane of the blade and behind the fixed fence, the auxiliary fence being higher than a highest point on the fixed fence and having a substantially vertical support surface extending upwardly above the substantially horizontal support surfaces of the fixed fence, the substantially vertical support surface being coplanar with a second substantially vertical support plane substantially parallel to the first support plane, so that when the movable fence is removed, no portion of the fence assembly is both above the fixed fence and in front of the second support plane, allowing the auxiliary fence to contact the workpiece;
   wherein the blade is movable in a rearward direction from the lower position to a position at least partially behind the auxiliary fence, and
   wherein the auxiliary fence remains stationary during movement of the table.

2. The saw of claim 1, further comprising a support housing connected to the table and the saw assembly, wherein at least one rail slidably connects one of the table to the support housing or the support housing to the saw assembly.

3. The saw of claim 2, wherein the saw assembly further comprises a trunnion disposed on the at least one rail that is slidably attached to the support housing, the pivot arm being pivotably attached to the trunnion.

4. The saw of claim 1, wherein the horizontal support surfaces are substantially parallel to an upper surface of the base.

5. The saw of claim 1, wherein the horizontal support surfaces are substantially perpendicular to the first support plane.

6. The saw of claim 1, wherein the fixed fence has a surface which is substantially coplanar with the first support plane.

7. The saw of claim 1, wherein a distance between the first and second support planes is about 1.65 inches.

* * * * *